March 25, 1952   L. J. BERBERICH ET AL   2,590,493
FLEXIBLE SILICEOUS SHEET MATERIAL, PROCESS
OF MAKING AND COMPOSITION THEREFOR
Filed Oct. 30, 1946
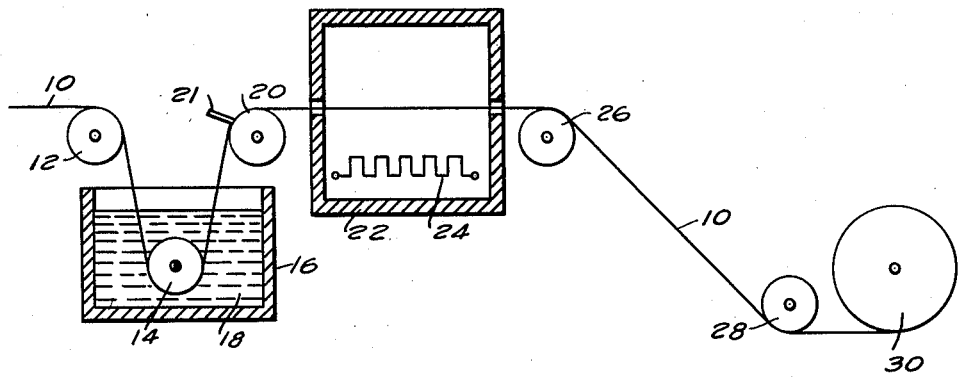
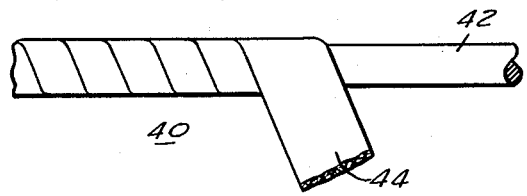
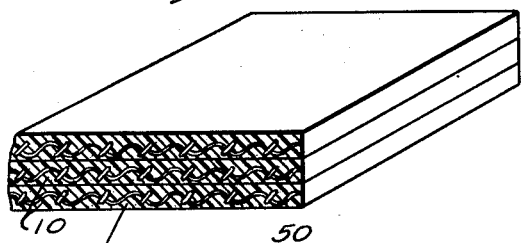
Phenyl Methyl Siloxane and
Hydrogenated Terphenyl.
WITNESSES:
INVENTORS
Leo J. Berberich and
Orville E. Anderson.
BY
Frederick Shapoe
ATTORNEY Patented Mar. 25, 1952

2,590,493

UNITED STATES PATENT OFFICE 2,590,493

FLEXIBLE SILICEOUS SHEET MATERIAL, PROCESS OF MAKING, AND COMPOSITION THEREFOR

Leo J. Berberich and Orville E. Anderson, Pittsburgh, Pa., assignors to Westinghouse Electric Corporation, East Pittsburgh, Pa., a corporation of Pennsylvania Application October 30, 1946, Serial No. 706,759

8 Claims. (Cl. 117—46)

This invention relates to organo-polysiloxane compositions and members produced therefrom, characterized by elasticity and resilience.

It has been found desirable, in working with polysiloxane resins, to prepare members therefrom that are flexible or resilient, whereby they may be employed as tapes, wrapping or the like without cracking or otherwise being difficult to apply and use.

Ordinarily, organo-polysiloxane resins are thermoset materials characterized by good thermal stability, but being of relatively low elasticity and flexibility. Under load, their elongation is relatively low. It is quite difficult to do a good taping or wrapping job with glass cloth impregnated with a thermoset polysiloxane resin. During normal use, members to which the organo-polysiloxane resins have been applied are subject to various strains such, for example, as are produced by thermal expansion and contraction. Thus, a copper conductor is subject to considerable expansion and contraction when in use in a motor or generator and relatively inelastic or brittle organo-polysiloxane resins applied thereto may crack during such expansion and contraction, thereby impairing the electrical insulation characteristics thereof. Therefore, it is desirable to have available organo-polysiloxane resins of predetermined elasticity and flexibility suitable for various commercial purposes.

Conventional plasticizers or softening materials have been found to be quite unsuitable in organo-polysiloxane resins. In most cases, conventional organic plasticizers are not compatible with the organo-polysiloxane resins and, on curing, serious impairment of the physical and insulating properties occurs without any benefits. Furthermore, many plasticizers or the like have significant vapor pressure at the temperatures of intended use of organo-polysiloxane resins, that is, within a temperature range of about 100° to 200° C. In a short while, under such temperature conditions, these plasticizers will have evaporated and the residual resins might be impaired.

The object of this invention is to provide for combining organo-polysiloxane resins containing a substantial proportion of phenyl groups with substantially hydrogenated terphenyl to provide for a resilient and elastic composition.

A further object of this invention is to provide a composite material comprising glass fibers and an organo-polysiloxane resin containing a substantial proportion of phenyl groups combined with a substantially hydrogenated terphenyl.

Other objects of the invention will in part be obvious and will in part appear hereinafter. For a fuller understanding of the nature and objects of the invention, reference should be had to the following detailed description and drawing, in which:

Figure 1 is a schematic view in elevation, partly in section, of an apparatus for heat-treating glass fiber material;

Fig. 2 is a view in perspective of a conductor being wrapped with a tape; and

Fig. 3 is a view in perspective, partly in cross-section, of a conductor being wrapped with a tape.

It has been discovered that a liquid isometric mixture of hydrogenated terphenyls hereinafter referred to as "hydrogenated terphenyl" possesses novel and unexpected characteristics, such that it may be combined with organo-polysiloxanes containing a substantial proportion of phenyl groups to produce flexible and elastic compositions heretofore unavailable in the art. The "hydrogenated terphenyl" consists of ortho, meta and paraterphenyl hydrogenated from 40% and higher. A particularly good hydrogenated terphenyl had the average composition $C_{18}H_{22}$. From 1% to 50% by weight of the composition may be composed of the hydrogenated terphenyl, the balance being an organo-polysiloxane resin containing a substantial proportion of phenyl groups. While 1% of the hydrogenated terphenyl is beneficial, larger amounts of from 5% and up confer marked benefits. The hydrogenated terphenyl is preferably combined with the organo-polysiloxane in solution and thereafter, the composition may be treated and cured substantially according to the practice established for the organo-polysiloxane resin alone. It is feasible to combine hydrogenated terphenyl with a low polymeric siloxane in a liquid state without any solvent being present.

We have prepared compositions embodying a relatively low polymeric phenyl alkyl siloxane, such as phenyl methyl polysiloxane and phenyl ethyl polysiloxane, with varying proportions of hydrogenated terphenyl. These compositions have been applied to various members as impregnants, coatings, or cast or molded alone, and highly elastic and flexible members have been produced therefrom.

Particularly desirable products have been obtained by treating glass fiber material, such for example, as glass cloth, glass braid, knitted glass fabric, and the like, with the organo-polysiloxane compositions carrying hydrogenated terphenyl.

Such glass fiber material is conventionally produced by drawing glass filaments of an average diameter of 0.002 inch and less, usually about 0.0002 inch in diameter, and combining a number of filaments, ordinarily from 100 to 400, into single threads or strainds with an organic lubricant applied to the filaments to prevent the glass fibers from abrading and cutting one another due to their naturally harsh texture. Conventional lubricants for this purpose are vegetable oils and starch, although other organic coatings have been applied as well. The presence of the organic lubricant is attended with several disadvantages in the preparation of resin treated products therefrom by combining them with organo-polysiloxane resins. Starches and vegetable oils tend to prevent a satisfactory bonding of the organo-polysiloxane resin to the fibers or filaments of glass. In some cases, the starch coating on the bundle of filaments formed into a thread acts to draw in moisture by capillary action from any end exposed to the atmosphere. Numerous disadvantages therefore are present if the organic lubricant is permitted to remain in the glass fibers.

Members are preferably prepared from glass fiber materials originally provided with an organic lubricant by applying thereto a pre-coating of a phenyl methyl polysiloxane in a small amount and then heat-treating the glass fiber material at temperatures sufficient to volatilize or carbonize the organic lubricant. Exceptionally satisfactory bonding of the polysiloxane resin and notable improvement in other properties have been attained by this treatment.

Referring ot Figure 1 of the drawing, there is illustrated an apparatus for heat treating glass fiber material in accordance with the invention. Glass fiber material 10, such, for example, as glass cloth coated with an organic lubricant, such as a vegetable oil or starch or the like, passes over rollers 12 and 14 where it is coated in the tank 16 with a fluid phenyl methyl polysiloxane 18 polymerizable to a solid resinous state. The phenyl methyl polysiloxane 18 may be a solution composed of a polysiloxane dissolved in an organic solvent, such as toluene, or it may be a low polymeric phenyl methyl siloxane intrinsically of a low viscosity. The glass fabric 10 coated with the fluid phenyl methyl polysiloxane emerges from the bath and passes over a roller 20 cooperating with a doctor blade 21 or other wiping means for maintaining a predetermined amount of the fluid phenyl methyl polysiloxane on the glass cloth.

In practice, it has been found that best results are secured when the amount of phenyl methyl polysiloxane present in the glass cloth varies from about 5% to 15% of the weight of the glass cloth. A substantially greater amount of the polysiloxane results in blistering during subsequent heat treatment. If substantially less than 5% of phenyl methyl polysiloxane is present, the advantages of the invention are not attained.

The phenyl methyl polysiloxane is preferably combined with a small proportion of hydrogenated terphenyl in order to secure the optimum plasticity and resilience of the final composite product. A phenyl methyl polysiloxane containing 25% by weight of hydrogenated terphenyl was applied as a solution of a viscosity of 0.23 poise at 25° C. to woven glass fiber cloth. The solvent for the polysiloxane and hydrogenated terphenyl was a petroleum fraction having a boiling point of from 135° C. to 147° C. admixed with an equal volume of toluene.

Again referring to Fig. 1, the polysiloxane treated glass cloth 10 then passes through an oven 22 provided with a heating element 24 wherein a temperature of from about 300° C. to 320° C., is maintained in order to volatilize and to carbonize the organic lubricant present on the glass cloth. At 320° C., an exposure of three minutes for two mil thick glass cloth is sufficient to eliminate the organic lubricant, without volatilizing the hydrogenated terphenyl unduly. For other temperatures, the heating interval may be made proportionately shorter. The time of heat-treatment may be somewhat longer, particularly at lower temperatures, but should not be so long as to decompose to any substantial degree the polysiloxane or to volatilize an excess of the hydrogenated terphenyl. The fluid phenyl methyl polysiloxane cures during the heat treatment to a tack-free solid resinous state. Obviously, a gas burner or other suitable source of heat may be employed in the oven 22. The glass cloth will be found to be much smoother after the heat treatment. Thereafter, the glass cloth passes over guide rolls 26 and 28 and may be wound up into a roll 30 for a subsequent use.

For coating the glass fiber material prior to heat treatment, any of a variety of phenyl methyl polysiloxanes has been found satisfactory. Hereinafter the term R denotes the hydrocarbon groups bonded to silicon in the siloxanes. For example, a phenyl methyl polysiloxane having a ratio of R to Si of slightly less than 2 wherein one-third of the R's are phenyl groups and the remainder are methyl groups gave excellent results. The viscosity of different fluids of this class used with success varied in viscosity from 50 to 75 centistokes. In another case, a phenyl methyl polysiloxane having R to Si ratio of 1.5 and having a substantially equal number of phenyl and methyl groups was employed successfully. In still another case, the phenyl methyl polysiloxane had an R to Si ratio of 1.2 and containing a substantially equal number of phenyl and methyl groups was applied to the glass cloth with similarly satisfactory results. On the other hand the use of a dimethyl silicon did not produce satisfactory results on heat treatment. It is believed that during the heat treatment, the phenyl methyl polysiloxane undergoes some chemical and physical changes concurrently with the carbonization and volatilization of organic lubricant whereby the phenyl methyl polysiloxane penetrates into the interstices of each fiber and further adheres to each glass filament in a manner not obtainable if it were applied after heat treatment.

From 10% to 50% by weight of hydrogenated terphenyl is preferably present in the phenyl methyl polysiloxane composition since this provides for a resilient and elastic bond with the glass fibers. The glass fiber fabric and applied polysiloxane resin will produce members of better strength and shock resistant properties by reason of the presence of these substantial amounts of hydrogenated terphenyl.

The heat-treated glass fiber material coated with the phenyl methyl polysiloxane, alone or with hydrogenated terphenyl present therein, is coated with additional phenyl-alkyl polysiloxane having a substantial proportion of phenyl groups combined with from 1% to 50% by weight of hydrogenated terphenyl. Phenyl methyl and phenyl ethyl polysiloxanes are ordinarily preferred since they are highly heat stable; phenyl methyl being somewhat better with regard to heat stability than any other phenyl alkyl polysiloxane. The proportion of hydrocarbon groups per silicon atom may vary considerably. The most useful resins have a ratio of R to Si of from 2 to 1 or even less. Approximately 20% of the R groups should be phenyl and the remainder alkyl groups. Dimethyl siloxane was found to be incompatible with hydrogenated terphenyl.

The heat-treated glass fiber material may be coated with varying amounts of additional phenyl alkyl polysiloxane resin combined with hydrogenated terphenyl. For producing sheet material for electrical insulating applications, for instance as tapes and coil wrappings, from 20% to 100% by weight, or more, of phenyl alkyl polysiloxane and hydrogenated terphenyl may be applied to the heat-treated pre-coated glass fiber material. The polysiloxane resin composition will completely impregnate the glass fiber sheet and produce a pore-free, smooth-surfaced product characterized by considerable elasticity and flexibility.

As examples of the improved materials produced in accordance with the present invention, the following were produced. Glass cloth pretreated with 10% by weight of a composition composed of 75% of phenyl methyl polysiloxane and 25% by weight of hydrogenated terphenyl was coated with a composition composed of 75 parts by weight of a phenyl methyl polysiloxane having an R to Si ratio of 1.5 and a substantially equal number of phenyl and methyl groups, and 25 parts by weight of hydrogenated terphenyl. The viscosity of the solution was 0.55 poise. Three different thicknesses of glass cloth were treated, the normal thickness thereof originally being 0.002, 0.003 and 0.004 inch respectively. The following table gives the treating conditions:

Table I

|  | A | B | C |
|---|---|---|---|
| Original Thickness of Glass Cloth plus 10% phenyl methyl polysiloxane and hydrogenated terphenyl | 0.002 | 0.003 | 0.004 |
| Number of Additional Coatings of 75% phenyl methyl polysiloxane, 25% hydrogenated terphenyl | 1. | 2. | 3. |
| Oven temperature | 300° C. | 320° C. | 310° C. |
| Final thickness | 0.0032 | 0.0073 | 0.010 |

For the purposes of comparison, three similar glass fiber fabrics were coated with the same phenyl methyl polysiloxane resin alone under similar conditions to substantially the same final thickness. The properties of the respective materials are listed in the following table:

Table II

| Resin Coating | 75% Polysiloxane and 25% Hydrogenated Terphenyl | | | Polysiloxane Alone | | |
|---|---|---|---|---|---|---|
|  | A | B | C | D | E | F |
| Final Thickness of Glass Cloth and Resin | 0.0032 | 0.0073 | 0.010 | 0.0032 | 0.007 | 0.0115 |
| Dielectric Strength—Volts/Mil. —¼" Diam. Electrodes | 2540 | 2140 | 1790 | 2280 | 2100 | 1525 |
| Dielectric Strength—Volts/Mil. —10% Elongation of Tape | 1760 | 1500 | 1530 | 1580 | 1445 | ------ |
| Power Factor 60 Cycles, 145° C | 1.5% | 0.7% | 0.9% | 4.8% | 1.2% | 1.1% |
| Percent Elongation 5 lb. Load Inch Wide Tape cut 45° Bias | 38.5% | 16.5% | 5% | 5% | 0.3% | 0. |

It will be apparent that a remarkable improvement in the elasticity has been obtained without impairment of the electrical properties of the material, in fact the electrical properties in the table are superior when hydrogenated terphenyl is employed. Furthermore, the surface condition of the treated materials was quite smooth, without rough spots or pimples, or other objectionable features present.

High temperature tests have been made to determine the weight loss of the composite materials prepared from the organo-polysiloxanes and hydrogenated terphenyl disclosed herein. No substantial difference in weight loss at 200° C. has been found by comparing similar members of thicker treated cloth prepared with and without hydrogenated terphenyl. Thus, after 692 hours at 200° C. in a forced draft oven, the 0.010 inch thick material C of Table II lost 2.74% in weight, while the 0.0115 inch thick material F without hydrogenated terphenyl lost 3.06% in weight. Therefore, the compositions of the present invention are well suited for use at elevated temperatures of up to 200° C.

The hydrogenated terphenyl plasticized organo-polysiloxane treated glass fiber material may be employed where flexible and resilient material is required. A particularly desirable application is as coil wrappers, end winding tapes and conductor insulation for dynamo-electric equipment. The tapes and wrappers are so flexible that they may be easily applied tightly and uniformly.

Referring to Fig. 2 of the drawing, there is illustrated an insulated conductor 40 comprising a metallic conductor 42 being provided with a half-lapped tape insulation 44 composed of glass fiber cloth heat treated in accordance with the present invention and then coated with sufficient additional phenyl alkyl polysiloxane and hydrogenated terphenyl to produce an impervious, flexible smooth sheet. The tape 44 not only permits the winding of a motor to be accomplished more easily due to its smoothness, but exhibits a greater elasticity and resilience than possible with previous polysiloxane and glass fiber materials and it also possesses better electrical characteristics.

The glass fiber material combined with organo-polysiloxane and hydrogenated terphenyl composition of this invention is particularly suitable for the preparation of laminated members for high temperature use. Referring to Fig. 3 of the drawing, there is illustrated a laminated member 50 composed of a plurality of sheets 10 of glass cloth coated with phenyl methyl polysiloxane and hydrogenated terphenyl resin. A laminate similar to that shown in Fig. 3 may be prepared by applying to 7 mil thick glass cloth initially coated with a phenyl alkyl polysiloxane and hydrogenated terphenyl composition and heat treated to remove the organic lubricant, sufficiently more of a solution of a phenyl methyl polysiloxane and hydrogenated terphenyl having an R to Si ratio of from 1 to 1.2 in an amount approximately equal to the weight of the glass cloth. The coated glass fiber cloth is dried by moderate heating in order to remove the solvent alone without curing the siloxane. The sheets of glass cloth with the solvent-free siloxane resin may be superimposed and subjected to a pressure of from 100 to 2000 pounds per square inch at a temperature of 200° C. for one hour. A resilient and non-brittle laminated member of high bond strength will be produced.

The organo-polysiloxane resin and hydrogenated terphenyl composition may be applied to other inorganic materials to advantage. Asbestos cloth may be coated in a manner similar to the procedure set forth in treating glass materials. Mica flakes, either in a finely-divided form or as large flakes, may be combined with the compositions of this invention and cured to produce mica-filled resinous bodies or mica insulation which is relatively flexible and suitable for making mica wrappers, mica tape and the like.

Compositions embodying (a) 50% phenyl methyl polysiloxane and 50% hydrogenated terphenyl, and (b) 50% phenyl ethyl polysiloxane and 50% hydrogenated terphenyl were each poured into separate circular forms and cured at 200° C. in two hours to thermoset discs. The ratio of R to Si in both cases was about 1.5 to 1, and the phenyl groups formed approximately half the R groups. The discs were found to be markedly more flexible and elastic than discs cast from the phenyl methyl polysiloxane and phenyl ethyl polysiloxane alone. The curing time was not appreciably different when the hydrogenated terphenyl was employed.

It will be apparent that a minor proportion of a compatible different organo-silicon oxide may be admixed with the phenyl alkyl siloxanes. Catalysts, such as cobalt napthenate, lead resinate, and the like, may be added to expedite curing of the siloxane.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. The process of producing a flexible sheet material from glass fiber sheets carrying vegetable oil organic lubricant comprising applying to the sheet of glass fibers from about 5% to 15% of the weight of the fibers of a coating composed of from 99% to 50% by weight of a fluid phenyl methyl polysiloxane in which the phenyl group comprises at least 20% of the total of phenyl and methyl groups and from 1% to 50% by weight of liquid terphenyl hydrogenated at least 40%, heat-treating the coated glass fiber sheet at a temperature of from about 300° C. to about 320° C. for a sufficient period of time to volatilize and carbonize the organic lubricant but not sufficient to deteriorate the phenyl methyl siloxane or evaporate an excess of the hydrogenated terphenyl, and applying to the heat-treated sheet an additional coating of the same fluid polymerizable phenyl methyl polysiloxane and hydrogenated terphenyl and heat-treating the additional coating to polymerize the phenyl methyl polysiloxane.

2. The process of producing a flexible sheet material from glass fiber sheets carrying starch organic lubricant comprising applying to the sheet of glass fibers from about 5% to 15% of the weight of the fibers of a coating composed of from 99% to 50% by weight of a fluid phenyl methyl polysiloxane in which the phenyl group comprises at least 20% of the total of phenyl and methyl groups and from 1% to 50% by weight of liquid terphenyl hydrogenated at least 40%, heat-treating the coated glass fiber sheet at a temperature of from about 300° C. to about 320° C. for a sufficient period of time to volatilize and carbonize the organic lubricant but not sufficient to deteriorate the phenyl methyl siloxane or evaporate an excess of the hydrogenated terphenyl, and applying to the heat-treated sheet an additional coating of the same fluid polymerizable phenyl methyl polysiloxane and hydrogenated terphenyl and heat-treating the adtional coating to polymerize the phenyl methyl polysiloxane.

3. A material comprising, in combination, a body of glass fibers, the fibers having been coated with at least one organic lubricant capable of carbonization at a temperature of from 300° C. to 320° C., subsequently coated with from 5% to 15% of the weight of the glass fibers of a coating composed of (a) from 99% to 50% by weight of a polymerizable phenyl methyl polysiloxane in which the ratio of phenyl and methyl groups to silicon is from 2:1 to 1:1, and the phenyl groups comprise at least 20% of the total number of phenyl and methyl groups, and (b) from 1% to 50% by weight of liquid terphenyl hydrogenated at least 40%, and then heat-treated to volatilize and carbonize the organic lubricant, and additional amounts of the same fluid polymerizable phenyl methyl polysiloxane and hydrogenated terphenyl composition polymerized on the heat-treated body of glass fibers.

4. In the process of producing a flexible sheet material from a sheet of glass fibers carrying an organic lubricant capable of carbonization at a temperature of from 300° C. to 320° C., the steps comprising applying to the sheet of glass fibers, in an amount equal to from 5% to 15% of the weight of the glass fibers, a coating of a composition composed essentially of (a) from 99% to 50% by weight of a fluid polymerizable phenyl methyl polysiloxane in which the phenyl groups comprise at least 20% of the total number of phenyl and methyl groups and (b) from 1% to 50% by weight of a liquid terphenyl hydrogenated at least 40%, heat-treating the coated sheet of glass fibers at a temperature of from 300° C. to 320° C. for a sufficient period of time to volatilize and carbonize the organic lubricant but not sufficient to deteriorate substantially the phenyl methyl polysiloxane or to evaporate an excess of the hydrogenated terphenyl, and applying an additional coating of the said composition, and heat-treating the sheet with the applied coating to polymerize the phenyl methyl polysiloxane.

5. A sheet material comprising, in combination, a sheet of glass fibers and a flexible resinous composition bonded to the glass fibers, the resinous composition composed essentially of the heat-treated product of a mixture of (a) from 99% to 50% by weight of a polymerizable phenyl methyl polysiloxane in which the phenyl groups comprise at least 20% of the total number of phenyl and methyl groups, and (b) from 1% to 50% by weight of terphenyl hydrogenated at least 40%, the sheet produced in accordance with the process of claim 4.

6. A sheet material comprising, in combination, a sheet of glass fibers and a flexible resinous composition bonded to the glass fibers, the resinous composition composed essentially of the heat-treated product of a mixture of (a) from 99% to 50% by weight of a polymerizable phenyl alkyl polysiloxane in which the phenyl groups comprise at least 20% of the total number of phenyl and alkyl groups, and (b) from 1% to 50% by weight of terphenyl hydrogenated at least 40%, the sheet produced in accordance with the process of claim 4.

7. A sheet material comprising, in combination, a sheet of siliceous fibers and a flexible resinous composition bonded to the siliceous fibers, the resinous composition composed essentially of the heat-treated product of a mixture of (a) from 99% to 50% by weight of a polymerizable phenyl methyl polysiloxane in which the phenyl groups comprise at least 20% of the total number of phenyl and methyl groups, and (b) from 1% to 50% by weight of terphenyl hydrogenated at least 40%, the sheet produced in accordance with the process of claim 4.

8. A resinous composition comprising essentially (a) from 50% to 99% by weight of a polymerizable phenyl alkyl polysiloxane in which the alkyl radical is selected from the group consisting of methyl and ethyl radicals, the polysiloxane containing phenyl radicals in an amount equal to at least 20% of the total number of phenyl and alkyl radicals, the ratio of the number of phenyl and alkyl radicals attached to silicon to the number of silicon atoms being from 1:1 to 2:1, and (b) from 50% to 1% by weight of liquid terphenyl hydrogenated at least 40%.

LEO J. BERBERICH.
ORVILLE E. ANDERSON.

REFERENCES CITED

The following references are of record in the file of this patent:

UNITED STATES PATENTS

| Number | Name | Date |
|---|---|---|
| 2,215,061 | Alt | Sept. 17, 1940 |
| 2,225,009 | Hyde | Dec. 17, 1940 |
| 2,258,222 | Rochow | Oct. 7, 1941 |
| 2,341,219 | Jones | Feb. 8, 1944 |
| 2,342,370 | Richter | Feb. 22, 1944 |
| 2,364,719 | Jenkins | Dec. 12, 1944 |
| 2,390,039 | Slayter et al. | Nov. 27, 1945 |
| 2,392,805 | Biefeld | Jan. 15, 1946 |
| 2,456,413 | Hunt | Dec. 14, 1948 |